US00RE35308E

United States Patent [19]

Favstritsky et al.

[11] E Patent Number: Re. 35,308

[45] Reissued Date of Patent: Jul. 30, 1996

[54] BLOCK COPOLYMER OF POLYALKYLENE AND HALOGENATED POLYSTYRENE

[75] Inventors: Nicolai A. Favstritsky, Lafayette; Rastko I. Mamuzic, W. Lafayette, both of Ind.

[73] Assignee: Shell Oil Company, Houston, Tex.

[21] Appl. No.: 432,109

[22] Filed: Mar. 13, 1995

Related U.S. Patent Documents

Reissue of:

[64] Patent No.: 4,966,946
Issued: Oct. 30, 1990
Appl. No.: 473,317
Filed: Feb. 2, 1990

[51] Int. Cl.[6] ..... C08F 297/04; C08F 297/08

[52] U.S. Cl. ..... 525/314; 525/319; 525/323; 525/324; 525/333.2; 525/288; 525/941; 525/333.4

[58] Field of Search ..... 525/314, 319, 525/323, 324, 941, 333.4, 332.3

[56] References Cited

U.S. PATENT DOCUMENTS

| | | | |
|---|---|---|---|
| 3,576,912 | 4/1971 | Winkler | 260/880 |
| 3,607,977 | 9/1971 | Taylor et al. | 260/876 |
| 3,629,371 | 12/1971 | Winkler | 260/880 |
| 3,686,366 | 8/1972 | Winkler | 260/880 B |
| 3,824,149 | 7/1974 | Harlan, Jr. et al. | 161/190 |
| 3,904,801 | 9/1975 | Harlan, Jr. | 428/246 |
| 3,917,742 | 11/1975 | Harlan, Jr. | 260/859 |
| 3,959,398 | 5/1976 | Jalics | 260/650 |
| 4,279,808 | 7/1981 | Hornbaker et al. | 260/45.75 B |
| 4,352,909 | 10/1982 | Barda et al. | 525/157 |
| 4,650,832 | 3/1987 | Kowalski et al. | 525/354 |
| 4,740,556 | 4/1988 | Abolins et al. | 525/68 |
| 4,851,476 | 7/1989 | Willis | 525/105 |
| 4,879,353 | 11/1989 | Sanders et al. | 525/357 |
| 4,940,807 | 7/1990 | DePriest | 549/434 |
| 4,975,496 | 12/1990 | Tigner et al. | 525/357 |
| B1 4,200,703 | 7/1987 | Diebel et al. | 525/340 |

FOREIGN PATENT DOCUMENTS

| | | |
|---|---|---|
| 2537385 | 2/1977 | Germany . |
| 2800013 | 7/1979 | Germany . |
| 2800012 | 7/1979 | Germany . |
| 3337223 | 5/1985 | Germany . |

OTHER PUBLICATIONS

Billmeyer, F. W. "Textbook of Polymer Science," N. Y. Interscience, 1965, pp. 292, 297 and 298.

*Primary Examiner*—Carman J. Seccuro, Jr.

[57] ABSTRACT

A block copolymer of polyalkylene and halogenated polystyrene comprises the formula:

$$S'—A—(A—S')_m$$

in which m is 0, 1, 3 or 4, A is a saturated polyalkylene, and S' is a nuclear brominated polystyrene having from about 0.5 to about 5 bromines per styrene unit. The polystyrene blocks are substantially free of halogen other than bromine and chlorine, and the polyalkylene is substantially free of halogen. The compositions retain the elastomeric properties of the non-halogenated form of the compounds while having significantly reduced flammability.

34 Claims, No Drawings

BLOCK COPOLYMER OF POLYALKYLENE AND HALOGENATED POLYSTYRENE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to novel block copolymers of polyalkylenes and halogenated polystyrenes, and more particularly to compositions retaining advantageous physical properties but having reduced flammability.

1. Description of the Prior Art

Saturated polyalkylenes, such as polyethylene, polypropylene, etc., display elastomeric properties which make them useful in varied applications. However, polyalkylenes have a higher flammability than is desired for certain applications. It is therefore advantageous to prepare a polymer which retains the elastomeric properties associated with the polyalkylenes, but which has reduced flammability.

As reported in U.S. Pat. No. 3,576,912, issued to Winkler on Apr. 27, 1971, halogenation of unsaturated polymers has been carried out in the prior art for preparation of fire resistant polymers. It has been found, however, that halogenation to an extent effective in providing the desired degree of fire resistance results in a loss of the elastomeric properties of the unhalogenated polymer. The Winkler patent further states that halogenation of butyl rubber has been somewhat successful, and that this results from halogenation at the conjugated diene linkages, rather than at saturated bonds.

The Winkler patent similarly discusses the preparation of block copolymers of monovinyl arenes and conjugated dienes in which the diene is selectively halogenated. The Winkler patent describes the substantially exclusive halogenation and/or quaternization of the conjugated diene polymer block (such as polybutadiene or polyisoprene), with the thermoplastic terminal blocks being substantially unaffected. The Winkler patent involves only selected classes of halogenating agents, namely N-haloimides, bromoanilides, bromoamines, and N-monohalohydantoins, or the corresponding chlorinated halogenating agents. The Winkler process intentionally provides for essentially no reaction in the monovinyl arene polymer blocks for the express purpose of maintaining the original physical properties of the block copolymer.

Related compositions are disclosed in U.S. Pat. No. 3,607,977, issued to Taylor, Cotton and Winkler on Sept. 21, 1971. The latter patent describes the preparation of block copolymer compositions having substantially increased polar character to promote adhesion to polar surfaces, as well as reduced flammability. The compositions comprise blends of two different block copolymers. The first block copolymer has the general configuration of A—B—(B—A)$_{1\text{-}5}$, wherein the "A" blocks are monovinyl arene blocks and the "B" blocks are conjugated diene blocks. The first block copolymer thus may comprise, for example, polystyrene-polybutadiene-polystyrene. The second block copolymer has the general configuration of A—C—(C—A)$_{1\text{-}5}$, in which the "A" blocks are monovinyl arene blocks and the "C" blocks may be polar, including halogenated, derivatives of the "B" blocks. Again, the halogenation is provided in the conjugated diene blocks and not the monovinyl arene blocks. The halogenation of the diene blocks is described, for example, as by the addition of HBr across the diene unsaturated linkages.

There has remained a desire for polyalkylene polymers which retain advantageous elastomeric properties, but which have reduced flammability. The present invention provides halogenated styrenic block copolymers which satisfy these criteria.

SUMMARY OF THE INVENTION

Briefly describing one aspect of the present invention, there is provided a block copolymer of saturated polyalkylene and nuclear halogenated polystyrene. The copolymer has from one to five polystyrene blocks, with from about 0.5 to about 5 bromines per styrene unit. The polyalkylene blocks are substantially free of halogen.

It is an object of the present invention to provide a halogenated styrenic block copolymer composition having blocks of polystyrene containing nuclear aromatic halogen, and blocks of saturated polyalkylene.

Another object of the present invention is to provide a halogenated styrenic block copolymer composition containing substantially all of the halogen in the polystyrene blocks.

A further object of the present invention is to provide a halogenated styrenic block copolymer composition wherein preferably greater than 70% of the halogen is bromine and the remaining halogen is chlorine, and more preferably greater than 90% of the halogen is bromine.

An additional object of the present invention is to provide a halogenated styrenic block copolymer which substantially retains its elastomeric properties, but which has lower flammability.

Further objects and advantages of the present invention will be apparent from the description of the preferred embodiment which follows.

DESCRIPTION OF THE PREFERRED EMBODIMENT

For the purposes of promoting an understanding of the invention, reference will now be made to the preferred embodiments of the invention and specific language will be used to describe the same. It will nevertheless be understood that no limitation of the scope of the invention is thereby intended, such alterations and modifications of the invention, and such further applications of the principles of the invention being contemplated as would normally occur to one skilled in the art to which the invention relates.

The present invention provides a polyalkylene-polystyrene block copolymer which substantially retains its elastomeric properties while having lowered flammability. The copolymer comprises blocks of polystyrene containing nuclear aromatic halogen, together with blocks of saturated polyalkylene. Substantially all of the [the] halogen is in the polystyrene blocks. The preferred halogen is bromine, with chlorine also being present in certain embodiments of the inventive composition.

The block copolymer of the present invention comprises polyalkylene and halogenated polystyrene represented by the formula:

$$S'—A—(A—S')_m$$

in which m is 0, 1, 2, 3 or 4, A is a saturated polyalkylene, and S' is a nuclear brominated polystyrene. The copolymer therefore has from one to five polystyrene blocks.

The contemplated structure of the composition will vary in accordance with the value of m. When m=0, the composition is a diblock comprising a single polystyrene block and a single polyalkylene block. When m=1, the two polyalkylene blocks may be considered as a single block, and the composition comprises a triblock with polystyrene blocks on each side of the polyalkylene block. With m=2 to 4, the composition may be multiblock, branched, or "star shaped". The value of m is preferably 0, 1 or 2.

The polyalkylene blocks may comprise any of a wide variety of saturated polyalkylenes. Representative examples include polyethylene, polypropylene, poly(ethylene-propylene), polybutylene, poly(ethylene-butylene) and combinations thereof. A particularly preferred composition has poly(ethylene-butylene) as the polyalkylene. It is preferred that the polyalkylene be substantially free of halogen.

The polystyrene blocks include nuclear halogen(s) and are represented by the formula:

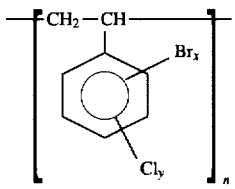

wherein n is an integer, x=0.5 to 5.0 times n, and y=0 to 1.5 times n. As used herein, "nuclear halogen", i.e., bromine or chlorine, refers to one which is present on the phenyl ring. As will be understood, the above formula represents that the polystyrene blocks are comprised of "n" number of repeating styrene units containing an average of "x" nuclear bromines per unit and an average of "y" nuclear chlorines per unit.

The nuclear halogen of the polystyrene blocks is preferably bromine. As indicated in the foregoing formula, the styrene units may include as many as about 5 bromines per unit. However, reduced flammability may also be realized with considerably lower bromine substitution, namely as few as about 0.5 bromines per styrene unit. The polystyrene blocks preferably include from about 1 to about 2 bromines per styrene unit.

The desired number of bromines per styrene unit may be selected to achieve the desired reduction in flammability without unacceptable affect on the elastomeric properties of a given composition. Typically, changes in the degree of bromination will have consequent affects on flammability and on physical properties. These properties may therefore be optimized for a particular copolymer and for a desired application by selecting the appropriate level of bromination. Thus, for a given composition (having a particular polyalkylene and value for "m" ), the degree of nuclear bromination may be selected to provide the desired reduction in flammability in view of any affect on the elastomeric properties of the composition. In general, the degree of nuclear bromination is to that level which yields significant reduction in flammability and which provides substantial retention of the elastomeric properties of the nonhalogenated form of the compound.

The polystyrene blocks may also include nuclear chlorines. The amount of nuclear chlorine, if any, is not critical to the invention, and it may comprise up to about 1.5 chlorines per styrene unit. However, bromine is preferred and preferably greater than 70% of the nuclear halogen is bromine. More preferably the bromine constitutes greater than 85%, and most preferably greater than 90%, of the nuclear halogen of the Polystyrene blocks. For example, for a fully substituted styrene unit in which x+y=5, a 70% presence of nuclear bromine would result in a preferred maximum of 1.5 chlorines per styrene unit, together with 3.5 bromines per styrene unit. For the preferred range of about 1 to 2 bromines per styrene unit, the chlorine would have a preferred maximum of about 0.5 to about 1 chlorine per styrene unit. The polystyrene blocks are preferably substantially free of nuclear halogen other than bromine and chlorine.

The present invention provides a block copolymer of polyalkylene and nuclear halogenated polystyrene which has reduced flammability but retains desired elastomeric properties. Thus, the present invention is particularly advantageous in relation to block copolymers of polyalkylenes and polystyrene which, in the non-halogenated form, have good elastomeric properties but undesirably high flammability. For these compositions, the modification of the polystyrene blocks to include nuclear halogens yields the contemplated advantage of producing a compound which substantially retains the elastomeric properties while having significantly reduced flammability. It is consequently an aspect of the present invention to modify such nonhalogenated polystyrenepolyalkylene block copolymers to provide copolymers having nuclear halogenated polystyrene blocks.

Further, it is an aspect of the present invention that the halogenated block copolymers of the present invention are useful in mixture with other polymers. For example, the present block copolymers will be compatible with the counterpart non-halogenated block copolymers. Other suitable polymers for mixing with the inventive copolymers can be determined without undue experimentation. In a blend, it may be desirable to use a halogenated block copolymer of the present invention having a relatively high bromine content, which upon blending with a non-halogenated polymer will yield a mixture having a lower overall bromine content. The inventive copolymers are therefore useful alone, or in combination with other polymers, and in either instance the composition will display reduced flammability while retaining desired physical properties.

The halogenated styrenic block copolymer of the present invention may be prepared by bromination of the polystyrene blocks using known techniques. In general, the bromination may be accomplished with various brominating agents, in the presence of different catalysts, and in different solvents. The particular method used for brominating the polystyrene blocks is not critical to the present invention, except that the method preferably results in the polyalkylene being substantially free of halogen. The following preferred method for bromination of the polystyrene blocks is therefore given for illustrative purposes only, and is not to be interpreted as limiting of the present invention.

A preferred method for preparing the inventive compositions of the present invention starts with a polystyrene - saturated polyalkylene block copolymer. The starting material may be represented by the formula:

$$S—A(A—S)_m$$

in which m is 0, 1, 2, 3 or 4, A is a saturated polyalkylene, and S is polystyrene (without nuclear halogen).

This compound may include a variety of polyalkylenes "A" as will yield the described compositions, for example: polyethylene, polypropylene, poly(ethylenepropylene), polybutylene, poly(ethylene-butylene) and combinations thereof. A preferred starting material is a triblock copolymer composed of polystyrene end blocks and a poly(ethylene-butylene) block. Such a compound is available from the Shell Chemical Company under the trademark "KRATON G-1650". This material contains approximately 29% polystyrene and approximately 71% poly(ethylene-butylene).

In the preparation method, the non-halogenated styrenic block copolymer is dissolved in an organic solvent, such as a chlorinated hydrocarbon solvent. The copolymer is then subjected to bromination with a brominating agent, for example bromine chloride, in the presence of a catalyst, such as Lewis acid (antimony trichloride). The unreacted brominating agent is then removed and the catalyst is inactivated. Finally, the brominated reaction product is isolated, as by adding the finished reaction mixture to a precipitating solvent and filtering.

The preparation of the brominated styrenic block copolymer may be more fully described as follows. The non-halogenated copolymer is contacted with an organic solvent such as methylene chloride until a clear solution is obtained. By way of example, dissolving usually involves use of 10–20 parts by weight of organic solvent per 1 part of "KRATON G-1650", and is usually completed in 1–2 hours at room temperature.

Bromination is carried out by adding a catalyst to the solution of the starting copolymer, and thereafter adding the brominating agent. Addition of the brominating agent is carried out with cooling, at low temperature, at such a rate that accumulation of the brominating agent is minimized. After an eventual dilution with more of the organic solvent, the unreacted brominating agent is removed and the catalyst inactivated. This is accomplished by adding to the finished reaction mixture an aqueous solution of a reducing agent, such as sodium sulfite, and agitating until the color of the brominating agent disappears. Treatment with the reducing agent is followed by phase separation, and washing of the organic layer repeatedly with water until neutrality is achieved.

After concentrating, isolation of the brominated reaction product is carried out by adding the neutralized reaction mixture to a large quantity of an energetically agitated aliphatic alcohol, such as methanol, and/or water. Addition of the reaction mixture can be carried out at room temperature, or at above room temperature. The latter approach has several advantages and is preferred. Thus, when the temperature of the alcohol or water is sufficiently high, i.e., sufficiently above the boiling point of the organic solvent used in the bromination step, the solvent will be continually distilling out and the droplets will "explode" in contact with the alcohol. This results in precipitation of brominated product in the form of fine, white particles. The organic solvent which distills out can be condensed and collected for recycling after being subjected to a purification step.

The final steps of the isolation of the brominated product are filtration and drying. Filtration may be performed using a sintered glass funnel and an aspirator, and proceeds quickly. This is followed by washing with methanol, the purpose of which is to remove the last traces of the mother liquor. The washed product is dried in an oven with forced air circulation at temperatures ranging from ambient room temperature to approximately 100° C.

The resulting product will have a bromine content that will vary with the parameters used for the preparatory process. This bromine content may be expressed in terms of percentage of the resulting material, or as the average number of bromines per styrene unit. For the example procedures using "KRATON G-1650", an approximate bromine content of 15% represents about 1 bromine per styrene unit. Similarly, a 30% bromine content correlates to approximately 2 bromines per styrene unit. The polyalkylene remains substantially free of halogen.

The starting material is essentially elastomeric in nature, and these physical properties are substantially retained and/or improved in the resulting product. In addition, the substrate material is rendered less flammable by introduction of the bromine.

The following preparative examples are provided to further illustrate this invention and the manner(s) in which it may be carried out. The specific details given in the examples, however, are for illustration only, and should not be construed as limiting the invention.

Example 1

"KRATON G-1650" (108.0 g.) (a polystyrene-poly(ethylenebutylene) block copolymer having about 29% polystyrene and about 71% poly(ethylene-butylene)) was dissolved in 2160 g. methylene chloride (20:1 wt./wt. on "KRATON") in a 5-liter flask, equipped with mechanical stirrer, thermometer, dropping funnel (25 ml), reflux condenser, and water bath. The dissolving of "KRATON" was carried out at room temperature, and took less than 1 hour. Antimony trichloride catalyst (0.6 g.) was added to the solution, followed by addition of bromine chloride (34.8 g.). Bromine chloride was added subsurface at a temperature of 20°–25° C., and resulted in evolution of a very small quantity of HCl/HBr (2 g.). The resulting reddish-brown reaction mixture was agitated at room temperature for 24 hours. During this period its color became light orange to dark yellow.

The finished reaction mixture was diluted with additional solvent, treated with aqueous $Na_2SO_3$ to eliminate residual bromine chloride, washed repeatedly with water until neutral, and concentrated by stripping to a volume of approximately 2 liters.

Using a peristaltic pump with a controller, the concentrated reaction mixture was fed dropwise, over 5–6 hours, at ambient temperature to energetically agitated methanol (10 1.) in a 12-liter flask. Agitation was continued overnight after the addition was finished. Brominated reaction product became coagulated and precipitated in the form of off-white elastomeric particles, which were filtered off, washed with methanol, and dried to constant weight. There was obtained 129.0 g. of brominated "KRATON", which contained 16.3% Br, or approximately 1 Br per styrene unit, and only 0.1% Cl.

Example 2

"KRATON G-1650" (180.0 g.) was dissolved in 3600 g. methylene chloride (20:1 wt./wt. on "KRATON") in a 5 liter flask equipped with mechanical stirrer, thermometer, dropping funnel (125 mi.), reflux condenser, and water bath. The dissolving of "KRATON" was carried out at room temperature, and took less than 1 hour. The solution was cooled to approximately 0° C., and $SbCl_3$ catalyst (1.0 g.) was added, followed by addition of bromine chloride (173.0 g.). Bromine chloride was added fast, with agitation, at a temperature of 0°–5° C. The resulting reddish brown reaction mixture was agitated at a temperature of 0°–5° C. for at least 4.5 hours, and subsequently at ambient temperature for another 24 hours.

The finished reaction mixture was diluted with additional solvent, treated with aqueous sodium sulfite to eliminate residual halogenating agent, washed repeatedly with water until neutral and free of halide, and concentrated by stripping to a volume of approximately 2 liters.

Using a peristaltic pump with a controller, the concentrated reaction mixture was fed to energetically agitated methanol at ambient temperature, as described in Example 1. Brominated reaction product that was precipitated in the form of off-white elastomeric particles was filtered off, washed with methanol, and dried to constant weight. There was obtained 270.4 g. of brominated "KRATON", which contained 33.5% Br, or approximately 2 Br per styrene unit, and 2.7% Cl.

Example 3

"KRATON G-1650" (180.0 g.) was dissolved in methylene chloride, and brominated with bromine chloride, as described in Example 1. The finished reaction mixture, after being treated with aqueous $Na_2SO_3$ and without washing, was divided into two approximately equal Parts A and B, which were worked up in two different ways, by adding them to (a) hot water, and (b) hot methanol, respectively.

Part A was fed dropwise, with energetic agitation, to hot water (5 liters). The temperature of the water was kept between 85° and 90° C. The addition resulted in precipitation of brominated product in the form of tacky clumps, and in distillation of a mixture of methylene chloride and water. After finishing the addition, heating was continued for 30 minutes. Heating was then discontinued, and the mixture was allowed to cool with agitation, which was continued overnight. The brominated reaction product was isolated by filtration, washed with methanol, and dried to constant weight. There was obtained 66.2 g. of brominated "KRATON" in the form of off-white elastomeric solid. The product contained 12.5% Br, or approximately 1 Br per styrene unit.

Part B was fed dropwise, with energetic agitation, to hot methanol (5 liters). The temperature of the methanol was kept around 60° C. The addition resulted in precipitation of brominated product in the form of small, white solid particles, and distillation of a mixture of methylene chloride and methanol. After finishing the addition, heating to around 60° C. was continued for 1 hour. Heating was then discontinued, and the mixture allowed to cool with agitation, which was continued overnight. The brominated reaction product was isolated by filtration, washed with methanol, and dried to constant weight. There was obtained 64.6 g. of brominated "KRATON" in the form of white, fluffy, small particles. The product contained 12.7% Br, or approximately 1 Br per styrene unit.

Example 4

The block copolymers of polyalkylene and nuclear halogenated polystyrene prepared in accordance with Examples 1, 2, 3A and 3B, as well as the starting "KRATON G-1650", were subjected to standard thermogravimetric analysis. The results of these analyses are set forth in Table I, which shows that very small losses occurred at the levels of 5% and 10% weight loss. The brominated products were found to be thermally stable.

TABLE I

| | TGA Loss at °C. | | Thermal | | |
|---|---|---|---|---|---|
| Example # | 5% | 10% | Stability | % Br. | % Cl |
| 1 | 408 | 428 | Yes | 16.3 | 0.1 |
| 2 | 378 | 409 | Yes | 33.5 | 2.7 |
| 3A | 381 | 415 | Yes | 12.5 | 5.1 |
| 3B | 385 | 416 | Yes | 12.7 | 5.1 |
| "G-1650" | 431 | 440 | Yes | — | — |

The brominated "KRATON", thus obtained was found to be thermally stable, both by thermogravimetric analysis, and by subjecting it to compression test at elevated pressure and temperature. That is, the physical properties and the backbone of the starting material were not destroyed and or substantially modified by bromination.

Example 5

Samples of the brominated products of Examples 1 and 2 were prepared for additional evaluation by molding the materials into test specimens. The product of Example 1 (approximately 8 g.) was molded by subjecting it to a temperature of 180° C., for 3 minutes, under pressure of 400 psi. The product of Example 2 (8 g.) was molded at 205° C., for 3 minutes, under pressure of 400 psi. Both samples fused under these molding conditions, and gave 3"×3" sheet specimens, approximately 0.02 inches thick. The molded specimens were inspected visually for uniformity, discoloration and clarity. The specimens were found to be uniform, clear to translucent, and non-discolored. In addition, the specimens were subjected to standard tests to evaluate thermal stability and physical properties. The results of these tests are set forth in Table II. These block copolymers of polyalkylene and brominated polystyrene were found to be thermally stable, and the physical properties of the starting material were not destroyed and/or substantially modified by bromination.

TABLE II

| | "G-1650" | Ex. 1 | Ex. 2 |
|---|---|---|---|
| Peak Tensile Strength, psi[1] | 3155 | 3950 | 3560 |
| % Elongation[1] | 661 | 627 | 521 |
| 300% Modulus, lb.[1] | 130 | 160 | 240 |
| 100% Modulus, lb.[1] | 294 | 322 | 373 |
| Shore A Hardness[2] | 74 | 79 | 84 |
| Oxygen Index[3] | 17.5 | 22.5 | 24.5 |

[1]ASTM D-412 (crosshead speed: 10 in./min.)
[2]ASTM D-2240
[3]ASTM D-2863-77

Example 6

Similar results are obtained for compounds of the types prepared in Examples 1-3, except with differing halogen levels and having other saturated polyalkylenes. For example, the preparatory methods of Examples 1–3 are repeated using block copolymer starting materials having the following polyalkylene blocks: polyethylene, polypropylene, poly(ethylene-propylene), polybutylene and combinations thereof. The resulting nuclear brominated block copolymers display properties comparable to those for the products of the preceding examples. Preparation of the foregoing compositions with differing bromine levels, for example about 0.5 and about 3 nuclear bromines per styrene unit, yields products which display comparable physical properties to those previously indicated.

What is claimed is:

1. A block copolymer of polyalkylene and halogenated polystyrene which comprises:

$$S'—A—(A—S')_m$$

in which m is 0, 1, 2, 3, or 4, A is a saturated polyalkylene, and S' is a nuclear halogenated polystyrene having from about 0.5 to about 5 bromines per styrene unit *and further including chlorine.*

2. The block copolymer of claim 1 in which A is substantially free of halogen.

3. The block copolymer of claim 1 in which S' is substantially free of nuclear halogen other than bromine and chlorine.

4. The block copolymer of claim 3 in which A is substantially free of halogen.

5. The block copolymer of claim 1 in which S' has from about 1 to 2 bromines per styrene unit.

6. The block copolymer of claim 5 in which A is substantially free of halogen.

7. The block copolymer of claim 5 in which S' is substantially free of nuclear halogen other than bromine and chlorine.

8. The block copolymer of claim 7 in which A is substantially free of halogen.

9. The block copolymer of claim 5 in which S' further includes up to about 1 nuclear chlorine per styrene unit.

10. The block copolymer of claim 9 in which at least about 70% of the nuclear halogens in the styrene units are bromines.

11. The block copolymer of claim 9 in which S' is substantially free of nuclear halogen other than bromine and chlorine.

12. The block copolymer of claim 9 in which A is substantially free of halogen.

13. The block copolymer of claim 1 in which S' [further includes] *contains* up to about 1.5 nuclear chlorines per styrene unit.

14. The block copolymer of claim 13 in which at least about 70% of the nuclear halogens in the styrene units are bromines.

15. The block copolymer of claim 14 in which at least about 85% of the nuclear halogens in the styrene units are bromines.

16. The block copolymer of claim 14 in which at least about 90% of the nuclear halogens in the styrene units are bromines.

17. The block copolymer of claim 13 in which A is substantially free of halogen.

18. The block copolymer of claim 13 in which S' is substantially free of nuclear halogen other than bromine and chlorine.

19. The block copolymer of claim 18 in which A is substantially free of halogen.

20. The block copolymer of claim 1 in which A comprises a saturated polyalkylene block selected from the group consisting of polyethylene, polypropylene, poly(ethylene-propylene), polybutylene, poly(ethylene-butylene) and combinations thereof.

21. A block copolymer of polyalkylene and halogenated polystyrene consisting essentially of:

$$S'—A—(A—S')_m$$

in which m is 0, 1, 2, 3, or 4, A is a saturated polyalkylene, and S' is a nuclear halogenated polystyrene having from about 0.5 to about 5 bromines per styrene unit *and further including chlorine.*

22. The block copolymer of claim 21 in which A is substantially free of halogen.

23. The block copolymer of claim 21 in which S' is substantially free of nuclear halogen other than bromine and chlorine.

24. The block copolymer of claim 21 in which S' has from about 1 to about 2 bromines per styrene unit.

25. The block copolymer of claim 21 in which A comprises a saturated polyalkylene block selected from the group consisting of polyethylene, polypropylene, poly(ethylene-propylene), polybutylene, poly(ethylene-butylene) and combinations thereof.

26. The block copolymer of claim 21 in which S' [further includes] *contains* up to about 1.5 nuclear chlorines per styrene unit.

27. The block copolymer of claim 26 in which A is substantially free of halogen.

28. The block copolymer of claim 26 in which at least about 70% of the nuclear halogens are bromines.

29. The block copolymer of claim 26 in which S' is substantially free of nuclear halogen other than bromine and chlorine.

30. A block copolymer of polyalkylene and halogenated polystyrene which comprises:

$$S'—A—(A—S')_m$$

in which m is 0, 1, 2, 3, or 4, A is a saturated polyalkylene, and S' is a halogenated polystyrene which *contains both chlorine and bromine and* comprises:

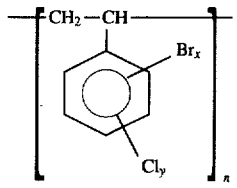

wherein n is an integer, x=0.5 to 5.0 times n, and y [=0] *is up* to 1.5 times n.

31. The block copolymer of claim 30 in which A is substantially free of halogen.

32. The block copolymer of claim 30 in which S' is substantially free of nuclear halogen other than bromine and chlorine.

33. The block copolymer of claim 30 in which S' has from about 1 to about 2 bromines per styrene unit.

34. The block copolymer of claim 30 in which A comprises a saturated polyalkylene block selected from the group consisting of polyethylene, polypropylene, poly(ethylene-propylene), polybutylene, poly(ethylene-butylene) and combinations thereof.

* * * * *